Figure 5:
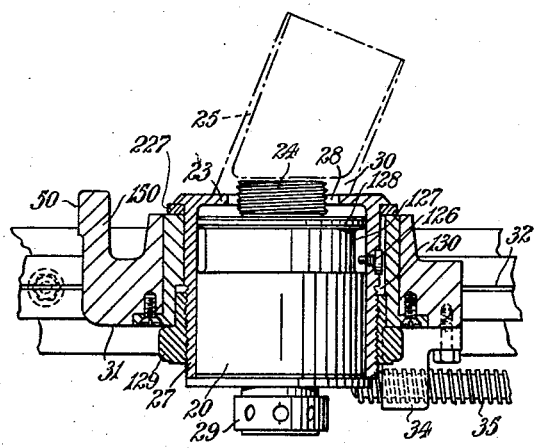

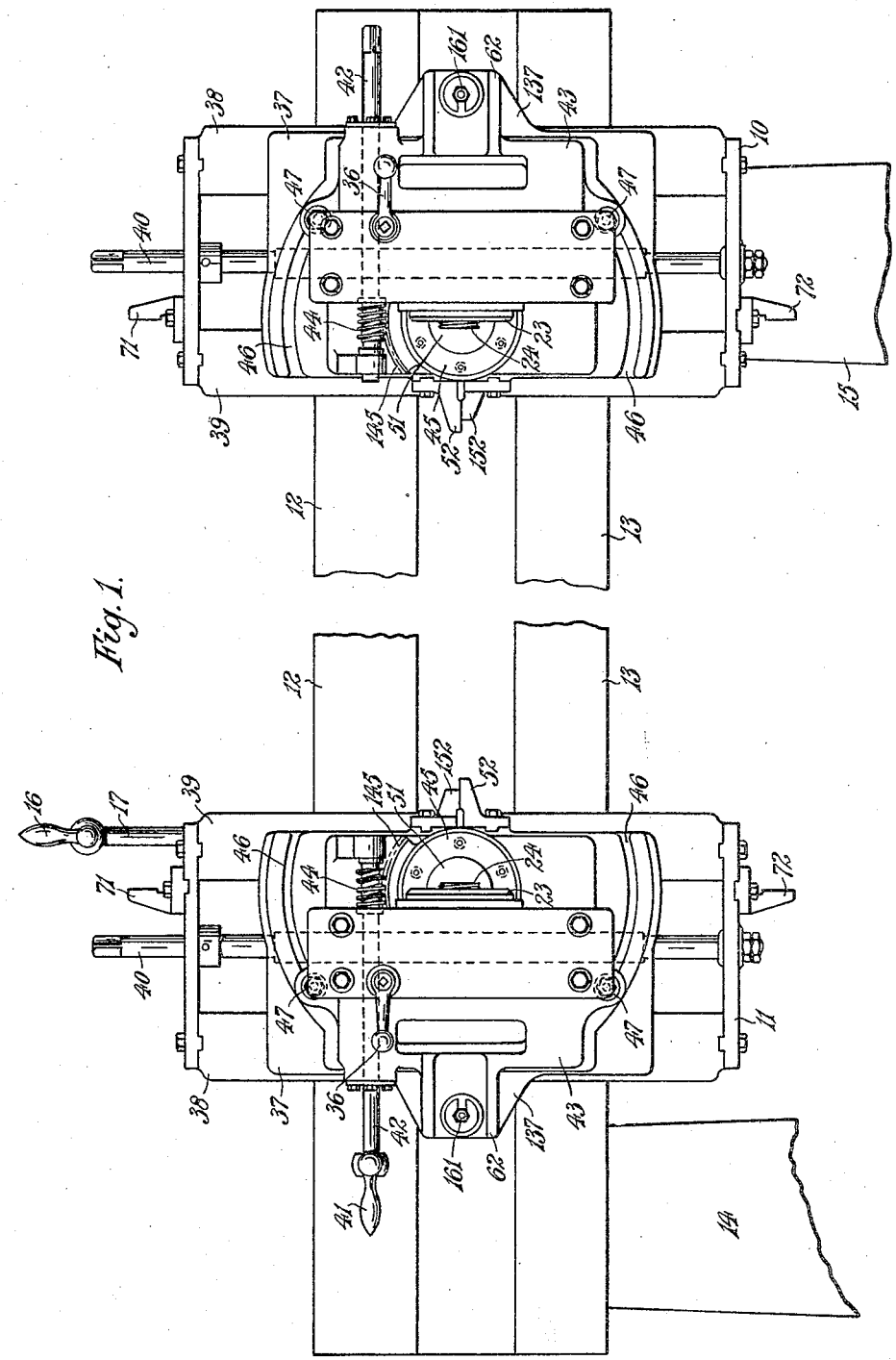

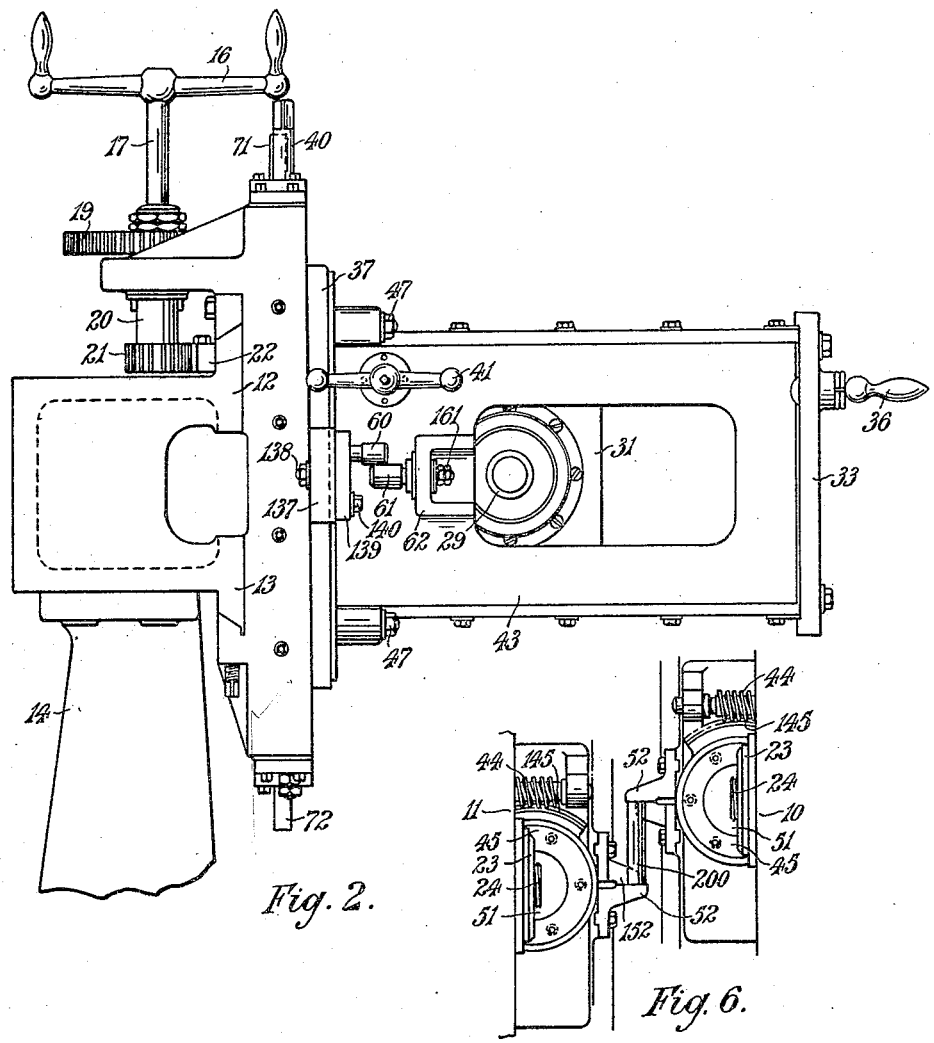

Dec. 13, 1932. B. N. WALLIS 1,891,127
APPARATUS FOR ASSEMBLING AND SECURING STRENGTHENING
SLEEVES TO THE ENDS OF TUBULAR MEMBERS
Filed March 14, 1932  4 Sheets-Sheet 4

Patented Dec. 13, 1932

1,891,127

UNITED STATES PATENT OFFICE

BARNES NEVILLE WALLIS, OF WEYBRIDGE, ENGLAND, ASSIGNOR TO VICKERS (AVIATION) LIMITED, OF WEYBRIDGE, ENGLAND

APPARATUS FOR ASSEMBLING AND SECURING STRENGTHENING SLEEVES TO THE ENDS OF TUBULAR MEMBERS

Application filed March 14, 1932, Serial No. 598,820, and in Great Britain April 11, 1931.

This invention is for improvements in the method of and apparatus for assembling and securing strengthening sleeves to the ends of tubular members.

The invention relates particularly to structures built up of a series of tubular members united to one another by means of flanged strengthening sleeves inserted in their ends. Where a change of direction occurs (i. e. where two adjacent tubular members have their axes inclined to one another at an angle instead of occupying the same straight line) it will be appreciated that the flanges of at least one of the strengthening sleeves at the junction in question must be inclined at an angle to the axis of the member to which it is attached.

The present invention has for its object to provide a method of and apparatus for registering such a sleeve with respect to its tubular members so as to ensure that when the sleeve and the tubular member are secured together, the flange of the sleeve will be at the correct inclination to the axis of the tubular member; and therefore, that the tubular member will be disposed at the correct angle to the next continuing tubular member in the structure.

The invention accordingly provides apparatus, particularly for use in registering a tubular member with respect to two flanged strengthening sleeves adapted to fit within its ends, comprising in combination two face plates, means for supporting strengthening sleeves and their flanges flush with said face plates, means for effecting relative three dimensional rectilinear adjustment between the face plates and means for effecting angular adjustment of the face plates to change their relative inclination.

According to a feature of the invention each face plate may be secured to or formed integrally with a headstock, said headstocks being capable of relative movement along a bed (e. g. by a rack and pinion adjustment) and each face plate may be capable of angular adjustment about an axis through its centre at right angles to the plane of the bed.

According to a further feature of the invention one at least of the headstocks may comprise a body portion mounted for sliding movement upon the bed, a slide mounted on the body and adjustable with respect thereto along guides extending in a direction parallel to the plane of the bed but at right angles to its length, a rectangular framework carrying a supporting block for the face plate within it, and adjustable with respect to it along guides extending at right angles to the plane of the bed said framework (together with the supporting block and face plate located therein) being mounted for angular movement with respect to the slide about an axis through the centre of the face plate extending at right angles to the plane of the bed.

The angular movement of the framework with respect to the slide may conveniently be effected by a worm and worm wheel, and the slide may be provided with arcuate guides to engage projections on the framework so as to guide and support the latter during its angular movement.

According to a further feature of the invention each face plate, may be provided with a screw plug, projecting from its surface and adapted to engage an internal screw thread on the sleeve, and means to adjust the screw plug to bring the flange on the sleeve flush with the face plate.

The bed of the machine may conveniently be arranged in a vertical plane and each headstock may be provided with three sets of gauge faces so disposed as to receive between them templets for determining the distance between the face plates measures horizontally (i. e. along the bed), vertically (i. e. across the bed), and at right angles to the plane of the bed respectively.

In a preferred embodiment of the invention one of the gauge faces for measuring displacement of the face plate at right angles to the plane of the bed may be mounted on top of a worm wheel, and the other gauge face may be formed on a lug projecting from the supporting block for the face plate.

Conveniently two parallel gauge faces, one facing upwards and the other downwards, and arranged one behind the other in the same horizontal plane, may be provided on each headstock for measuring vertical separaration of the two face plates (i. e. their separation in a direction across the bed) the upwardly facing gauge face on each headstock being arranged to co-operate with the downwardly facing gauge face on the other headstock.

According to a still further feature of the invention, the rectangular framework may carry a cylindrical projection which, in the normal position of the face plate, (i. e. the position in which its plane is parallel to the width of the bed) contacts with a similar projection carried by the slide, but which is arranged to move away therefrom on angular movement of the face plate about a vertical axis through its centre, the two projections serving as gauge faces for the reception of a templet for measuring such angular movement.

The invention includes a method of attaching a tubular member to strengthening sleeves having flanges inclined to the axis of the tubular member and adapted to fit within its ends, which consists in mounting the sleeves (supporting the tubular member between them) with their flanges in contact with the face plates of the above described apparatus, effecting such relative three dimensional movement of the face plates and (if required) such angular movement of the face plates about an axis extending along one of said directions as will bring the flanges of the sleeves into the desired inclination to the axis of the tubular member, forming (e. g. by drilling or punching) radial registering holes through the walls of the tubular member and the sleeves contained therein and securing the sleeves to the tubular member before or after their removal from the face plates. The tubular member may be temporarily secured (e. g. by holding pins) to the sleeves while the latter are still attached to the face plates, and permanently riveted to the sleeves after their removal from the face plates. Alternatively the tubular member may be permanently riveted to the sleeves while they are still attached to the face plates.

The method according to the invention includes the steps of setting the face plates at the correct distance apart in three mutually perpendicular directions and in the correct angular relationship to correspond with the desired inclination of the flanges of the sleeves to the axis of the tubular member by means of templets inserted between suitably disposed gauge faces mounted on members (e. g. headstocks) associated with the face plates.

Figure 4:
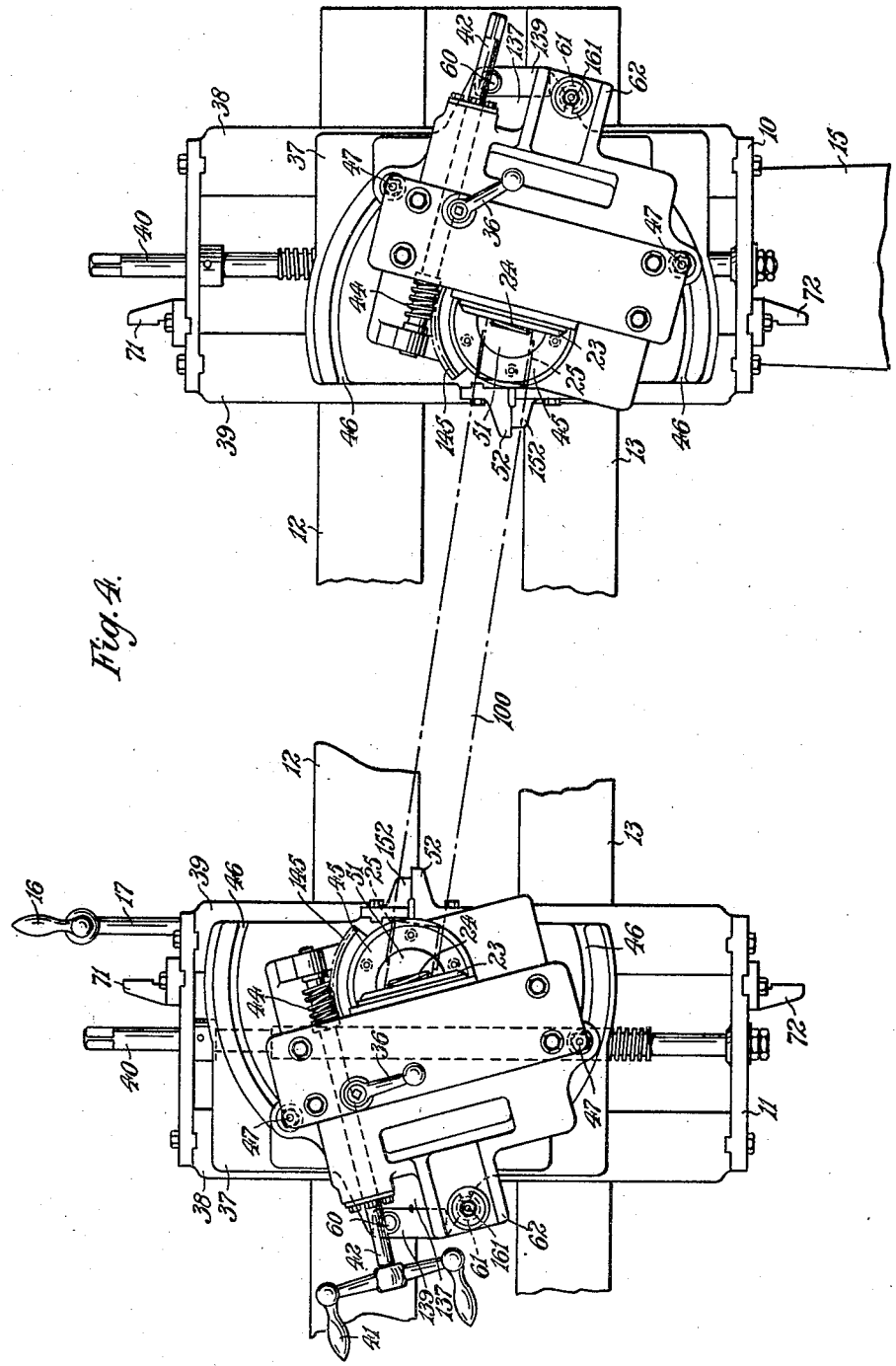

A practical embodiment of the invention will now be described in detail with reference to the accompanying drawings in which, Fig. 1 is a front elevation, Fig. 2 an end elevation, and Fig. 3 a plan view, partly in section, of the apparatus with the face plates in their central position;

Fig. 4 is a front elevation of the apparatus showing a tubular member and its accompanying strengthening sleeves supported between the face plates, which have been displaced from their central positions so that the sleeves have the desired orientation with respect to the tubular member, Fig. 5 is a part sectional view of one of the face plates and its associated parts, Fig. 6 is a part view showing the method of measuring the vertical separation of the two face plates.

Like reference numerals indicate like parts throughout the drawings.

The apparatus comprises two headstocks, 10, 11, one of which 10, is fixed in relation to the bed of the machine and the other of which 11, is slidably mounted on the bed which consists of two horizontal guides 12, 13, carried on vertical supports 14, 15. By operating the handle 16 the headstock 11 may be moved along the bed toward and away from the fixed headstock 10.

The handle 16 is mounted on a spindle 17 which carries a small pinion 18 the teeth of which mesh with those of a larger pinion 19 carried on the spindle 20. The spindle 20 also carries a second pinion 21 mounted below the pinion 19, which engages with a rack 22, carried on the bed of the machine. It will therefore be appreciated that by turning the handle 16, the headstock 11 can be caused to move along the bed of the machine and that a fine adjustment of the distance between the headstocks can be obtained owing to the high ratio of the gearing between the handle and the headstock.

The two headstocks 10, 11, are identical in construction with the above mentioned exception that no means are provided for moving the headstock 10 along the bed. Each headstock carries a face plate 23 which is provided with a screw plug 24 for engaging an internally screw-threaded strengthening sleeve 25. As illustrated in Fig. 5 of the drawings, the screw plug 24, which projects through the aperture 28 in the face plate 23, is carried by a drum 20 supported within the casing 27. The rear face of the drum 20 is provided with a boss 29. By turning the boss 29, the screw plug 24 may be adjusted so as to draw the sleeve towards the face plate 23 until its flange 30 lies flush against the face plate. The screw 126, although it does not contact with the waisted portion 127 of the drum, nevertheless serves as an abutment to intercept the flange 128 and prevent the drum from slipping out of the casing 27. The barrel shaped casing 27 is held in place by the tightening unit 129 against a horseshoe shaped washer 227. It will be appreciated that when a spar or girder is to be built up of sections united by means of flanged strengthening sleeves it is frequently required to slip lateral or other supporting members between the opposed flanges of adjacent strengthening sleeves. The thickness of the washer 227 is so calculated as to allow for the thickness of the lateral members in question. By loosing the nut 129 the washer 227 is readily removable. A series of washers of varying thickness is provided with the machine, and the operator by consulting the general arrangement drawing of the structure to be assembled can insert behind each face plate the washer appropriate to the lateral member in question. The casing 27 is prevented from rotating with respect to the block 31, by the fact that the head of the screw 126, is located in a narrow keyway 130 indicated in longitudinal section in Fig. 5.

The block 31 is slidably mounted in guides 32 located in the horizontal sides of the rectangular framework 33, and carries a bracket 34 having an internally threaded hole to receive and cooperate with the screw-threaded spindle 35. By manipulating the handle 36 on the spindle 35, the block 31 can be moved to and fro along the guides 32; and therefore rectilinear adjustment of the face plate can be obtained in a direction at right angles to the plane of the bed.

The rectangular framework 33 associated with each headstock is carried on a slide 37 which in turn is mounted on guides in the uprights 38, 39, of the headstock. By turning the screw threaded spindle 40 the slide 37 may be moved vertically up and down, and therefore, rectilinear adjustment of the face plate of each headstock across the bed may be obtained.

Angular adjustment of the face plate about a horizontal axis through its centre at right angles to the plane of the bed may be effected by means of the handle 41 mounted on the spindle 42. The spindle 42 carries a worm 44 which cooperates with the toothed quadrant 145 of a worm wheel 45. The rectangular framework 33, together with the block 31 located therein and the support plate 43 are mounted on the worm wheel 45 and are therefore caused to rotate with it thus effecting the desired angular adjustment of the face plate.

The slide 37 is provided with arcuate guides 46 to receive set screws 47 attached to the support plate 43. By adjusting these screws the face plate may be locked in the required position of angular adjustment.

It will be understood that considerable accuracy is required in the setting of the face plates on the two headstocks in order to ensure that the sleeves will be correctly registered with respect to the tubular member and the method of setting the face plates will now be described.

Figure 3:
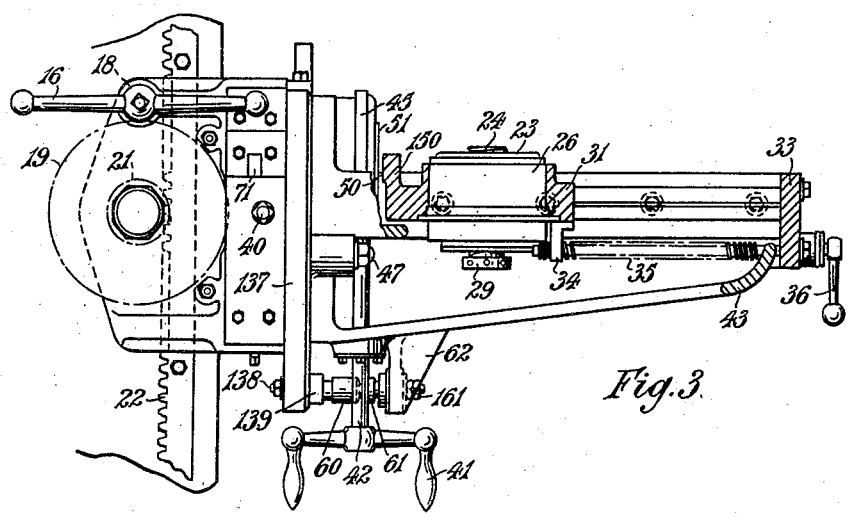

The machine is imagined to be set up with the face plates in the central position illustrated in Figs. 1, 2, and 3. The amount of offset in the vertical and horizontal directions of each face plate is first of all read off from the dimensions in elevation and plan on the drawings of the assembled tubular member and sleeves which are to be registered in the apparatus and each face plate is set to the desired horizontal and vertical offset by means of the spindle 40 and the handle 36 respectively.

The horizontal offset of each face plate is measured between a gauge face 51 mounted on top of the worm wheel 45, and the opposed parallel gauge face 50 on the lug 150 which projects from the face plate supporting block 31. It will be appreciated that in general it will only be necessary to give a horizontal movement to one of the headstocks, and if, therefore, the operator is provided with a templet of length equal to the desired horizontal offset it will be a simple matter for him to manipulate the handle 36 until the separation between the lugs 50 and 51 is just sufficient to enable the templet to be slipped between them. It is thus possible to set the face plates with very considerable accuracy to the desired horizontal offset.

The vertical offset of the face plates is preferably (unlike the horizontal offset) shared between the two headstocks in order to keep the work as near to the centre of the bed as possible. This is clearly shown in Fig. 4 in which the face plate on the headstock 11 has been moved upwards and that on the headstock 10 downwards from its central position. The reverse state of affairs is illustrated in Fig. 6.

Two pairs of horizontally extending gauge faces are provided for measuring the vertical offset of the face plates. Each headstock is provided with two such gauge faces viz. 52 and 152, which are mounted on the slide 37 with their measuring faces in the horizontal plane through the centre of the face plate. Each gauge face 52 is located slightly in front of the corresponding gauge face 152, as indicated in Fig. 6.

The vertical displacement of the face plates is effected as described above by turning the spindle 40. The operator is provided with a templet 200 of length equal to the desired offset, and in order to ensure that the correct offset has been obtained the headstock 11 is moved along the bed close up to the headstock 10, and the vertical offset is adjusted until the templet 200 will just pass between the gauge faces 52 as illustrated in Fig. 6.

It will be appreciated that when the face plate on headstock 10 is above the face plate on headstock 11 the gauge faces 52 will be employed for measuring the vertical offset as shown in Fig. 6. When however, as in Fig. 4, the face plate on headstock 10 is below that on headstock 11 it will be necessary to use the gauge faces 152 (which are located vertically above one another in a plane behind that occupied by the gauge faces 52) to accommodate the templet for measuring the vertical offset.

The apparatus is also provided with means whereby in order to obtain increased accuracy the angular adjustment of each face plate may be measured by means of a templet instead of by a pointer and scale.

Referring to Fig. 2 of the drawings, the support plate 43 for the rectangular frame 33 is provided with a bracket 62 to which a cylindrical lug 61 is secured by the double nut 161. The slide 37 is provided with a bracket 137 to which is secured, by means of a nut 138, a plate 139 carrying a second cylindrical lug 60. The lug 60 contacts with the lug 61 in the normal position of the face plate. The axis of the lug 61 is parallel to the axis about which angular movement of the face plate is effected, and when such angular movement takes place the lug 61 moves with the face plate, as illustrated in Fig. 4, so that the amount of angular adjustment of the face plate can be measured either by a micrometer or by a templet inserted between the opposed faces of the cylindrical lugs 60 and 61. Thus the operator may be provided with a templet for each face plate whose length corresponds to the desired angular displacement of that face plate; and he can therefore operate the handle 41 until the lug 61 has moved just far enough to enable the templet to be slipped between it and the lug 60, thus enabling a very accurate angular setting of the face plate to be obtained.

It will be appreciated that in the arrangement shown in Figs. 2 and 3 of the drawings the face plate of the headstock 11 can only be rotated in an anti-clockwise direction about a vertical axis through its centre perpendicular to the plane of the bed. Such an anti-clockwise rotation would correspond to a downward movement of the lug 61 in Fig. 2. Upward movement of the lug 61, and therefore clockwise rotation of the face plate, are clearly prevented by the lug 60.

If, however, it is desired to rotate the face plate in a clockwise direction the nut 138 may be unscrewed and the plate 139 removed and re-attached to the bracket 137 in the reversed position, i. e. with the lug 60 in the position previously occupied by the nut 140 and vice versa. It will be understood that in this case the lug 60 contacts with the lower edge of the lug 61 and permits of clockwise rotation of the face plate, but not of anti-clockwise rotation thereof.

After the face plates have been adjusted in the above described manner to the correct horizontal and vertical offset and to the correct relative inclination, the headstocks are separated by an amount sufficient to enable two sleeves 25 carrying a tubular member 100 between them to be attached to their respective face plates 25. This is effected by screwing up the plugs 24 until the flanges of the sleeves are flush with the face plates, so that the sleeves are held firmly against the face plates in their true relative positions as regards angular adjustment and horizontal and vertical offset.

Finally the headstock 11 is adjusted by the handle 16 until it is at the correct horizontal distance from the headstock 10. This is determined by means of the vertically extending gauge faces 71, each of which is arranged to lie in the vertical plane through the centre of its appropriate face plate. The handle 16 is turned until a templet of the correct length will just pass between the gauge faces 71. Auxiliary vertical gauge faces 72 are provided in case for any reason it is inconvenient to measure the horizontal displacement of the headstocks by means of the gauge faces 71.

It will be clear from the foregoing that the machine can be accurately adjusted by an unskilled workman provided he has the necessary five templets viz. one for measuring the horizontal offset of the face plates, one for the vertical offset, one for the angular adjustment of each face plate, and one for the horizontal distance between the face plates measured along the bed of the machine. In cases when only one of the face plates needs to be adjusted angularly, or when the angular adjustment of the two face plates is to be equal in extent, it is clear that the number of templets may be reduced to four.

It will be appreciated that when these various adjustments have been made the two sleeves will be completely adjusted with respect to the tubular member. The sleeves and the adjacent portions of the walls of the tubular member may then be drilled and, if desired, the sleeves may be secured to the tubular member by temporary holding pins to maintain them in their correct position until they can be secured by permanent rivets. Alternatively, the sleeves, after drilling, may be permanently secured to the tubular member by rivets while still attached to the face plates. To enable this to be done, cut-away portions must be provided in the sleeves and the corresponding portions of the tubular member to give access to the inner ends of the rivets.

What I claim as my invention and desire to secure by Letters Patent is:—

1. Apparatus for use in registering a tubular member with respect to flanged strengthening sleeves adapted to fit within its ends, comprising in combination a bed, two headstocks, face plates mounted on said headstocks, means for supporting strengthening sleeves with their faces flush with the faces of said face plates, means for effecting relative movement of the headstocks along the bed, means for effecting relative movement between the face plates and the headstocks across the bed and perpendicular to the plane of the bed, and means for effecting angular adjustment of each face plate about an axis through the centre of its face at right angles to the plane of the bed.

2. Apparatus for use in registering a tubular member with respect to flanged strengthening sleeves adapted to fit within its ends, comprising in combination a bed, two headstocks, face plates mounted on said headstocks, means for supporting strengthening sleeves with their faces flush with said face plates, means for effecting relative movement of the headstocks along the bed, means for effecting relative movement between the face plates and the headstocks across the bed and perpendicular to the plane of the bed, means for effecting angular adjustment of each face plate about an axis through the centre of its face at right angles to the plane of the bed, and gauge faces on each headstock for the reception of templets for determining the distance between the face plates measured along the bed, across the bed, and at right angles to the plane of the bed respectively.

3. Apparatus according to claim 1, in which at least one of the headstocks comprises a body portion mounted for sliding movement along the bed, guides in said body portion arranged parallel to the plane of the bed and at right angles to its length, a slide mounted for sliding movement along said guides, a frame mounted on said slide, a block carrying a face plate and slidably mounted in the frame for movement in a direction at right angles to the bed, a screw plug projecting from the surface of the face plate for the attachment thereto of a sleeve and means for effecting angular adjustment of the frame with respect to the slide about an axis through the centre of the face of the face plate at right angles to the plane of the bed.

4. Apparatus according to claim 1, in which at least one of the headstocks comprises a body portion mounted for sliding movement along the bed, guides in said body portion arranged parallel to the plane of the bed and at right angles to its length, a slide mounted for sliding movement along said guides, a frame mounted on said slide, and having projections co-operating with arcuate slots in the slide, a block carrying a face plate and slidably mounted in the frame for movement in a direction at right angles to the bed, and a worm and worm wheel adjustment for effecting angular adjustment of the frame with respect to the slide about an axis through the centre of the face of the face plate at right angles to the plane of the bed.

5. Apparatus according to claim 1, in which at least one of the headstocks comprises a body portion mounted for sliding movement along the bed, guides in said body portion arranged parallel to the plane of the bed and at right angles to its length, a slide mounted for sliding movement along said guides, a frame mounted on said slide, a block carrying a face plate and slidably mounted in the frame for movement in a direction at right angles to the bed, a screw plug projecting from the surface of the face plate for the attachment thereto of a sleeve, a worm and worm wheel adjustment for effecting angular adjustment of the frame with respect to the slide about an axis through the centre of the face of the face plate at right angles to the plane of the bed, and parallel gauge faces mounted respectively on the worm wheel and on a lug fixed to the block for measuring the displacement of the face plate at right angles to the plane of the bed.

6. Apparatus according to claim 1, in which at least one of the headstocks comprises a body portion mounted for sliding movement along the bed, guides in said body portion arranged parallel to the plane of the bed and at right angles to its length, a slide mounted for sliding movement along said guides, a frame mounted on said slide, a block carrying a face plate and slidably mounted in the frame for movement in a direction at right angles to the bed, a screw plug projecting from the surface of the face plate for the attachment thereto of a sleeve, a worm and worm wheel adjustment for effecting angular adjustment of the frame with respect to the slide about an axis through the centre of the face of the face plate at right angles to the plane of the bed, and cylindrical projections attached respectively to the slide and the frame, which are in contact with one another when the face plate occupies its normal position parallel to the width of the bed, and which serve, when separated by angular adjustment of the frame as aforesaid, as gauge faces for the reception of templets for measuring such angular adjustment.

7. Apparatus according to claim 1, in which at least one of the headstocks comprises a body portion mounted for sliding movement along the bed, guides in said body portion arranged parallel to the plane of the bed and at right angles to its length, a slide mounted for sliding movement along said guides, a frame mounted on said slide, a block carrying a face plate and slidably mounted in the frame for movement in a direction at right angles to the bed, a screw plug projecting from the surface of the face plate for the attachment thereto of a sleeve, a worm and worm wheel adjustment for effecting angular adjustment of the frame with respect to the slide about an axis through the centre of the face of the face plate at right angles to the plane of the bed, cylindrical projections attached respectively to the slide and the frame, which are in contact with one another when the face plate occupies its normal position parallel to the width of the bed, and which serve, when separated by angular adjustment of the frame as aforesaid, as gauge faces for the reception of templets for measuring such angular adjustment, and parallel gauge faces mounted respectively on the worm wheel and on a lug fixed to the block for measuring the displacement of the face plate at right angles to the plane of the bed.

8. Apparatus according to claim 2 in which each headstock is provided with two parallel gauge faces one facing upwards and the other downwards and arranged one behind the other in the same horizontal plane for measuring vertical separation of the two face plates, the upwardly facing gauge face on each headstock being arranged to co-operate with the downwardly facing gauge face on the other headstock.

9. Apparatus according to claim 2 in which each headstock is provided with two parallel gauge faces one facing upwards and the other downwards and arranged one behind the other in the same horizontal plane for measuring vertical separation of the two face plates, the upwardly facing gauge face on each headstock being arranged to co-operate with the downwardly facing gauge face on the other headstock, and with a vertical gauge face for measuring in co-operation with the corresponding vertical gauge face on the other headstock, the horizontal separation between the face plates.

In witness whereof I have hereunto set my hand.

BARNES NEVILLE WALLIS.